(No Model.)

C. BAUM.
STORE SERVICE TICKET.

No. 334,157. Patented Jan. 12, 1886.

*Witnesses:*
L. C. Hills
W. B. Masson

*Inventor:*
Charles Baum
by Abraham and Mayer
attorneys

N. PETERS, Photo-Lithographer, Washington, D. C.

UNITED STATES PATENT OFFICE.

CHARLES BAUM, OF WASHINGTON, DISTRICT OF COLUMBIA.

STORE-SERVICE TICKET.

SPECIFICATION forming part of Letters Patent No. 334,157, dated January 12, 1886.

Application filed November 7, 1884. Serial No. 147,377. (No model.)

*To all whom it may concern:*

Be it known that I, CHARLES BAUM, a citizen of the United States, residing at Washington, in the District of Columbia, have invented a new and useful Improvement in Store-Service Tickets, of which the following is a specification.

My invention relates to a device for keeping record of store-sales and auditing the same severally and collectively, whereby departments of a store shall be independently represented by a distinctive symbol on slip-tickets, said tickets being each provided with a special imprint that shall indicate a respective sales-clerk, and being further provided with a series of sectional spaces adapted to receive record of each sale as made, each of such sale-spaces being referred to by marginal numerals in consecutive order, each ticket being also provided with a sectional space in alignment with each sale-space, adapted and intended to receive record of the gross amount paid in by the customer before change is given for settlement of each separate purchase, and other separate sections alongside of each sale-space adapted to receive a specific audit-mark of the individual cashier who receives the slip and with it the gross payment from the customer as transmitted by the sales-clerk, and which cashier deducts from the gross sum so transmitted the net sum due from the purchaser, and returns the remainder to said sales-clerk for final delivery to said purchaser. The slip-tickets are further provided with certain sum-total spaces for record of the gross sum of all the sales tabulated on said ticket, and other spaces for reception of the gross sum appearing on each slip as received by each respective cashier, and another gross-sum space for record of the whole sum that the combined cashiers have collected separately from the several sales on each slip-ticket, which latter final amount, as will be readily understood, should tally with the gross total of the several sales, as indicated at the foot of the sales-sections. Said slip-tickets may have imprinted upon them special serial numbers for a purpose hereinafter explained.

In practicing my invention I also propose to employ a suitable bill-ticket or voucher, a sales-clerk's sale-book, the pages being divided into sections consecutively numbered up to a predetermined degree, adapted to receive in separation upon said sections a record of the amount of each sale, corresponding with the analogous numerically-designated space and entry thereon upon the slip-ticket.

Referring to the accompanying drawings, in which similar letters of reference indicate like parts on each figure, Figure 1 represents my improved slip-ticket as it appears before any entries are made thereon. Fig. 2 is a view of the same ticket, some of the spaces filled up with numerals and audit-symbols, illustrating its functions and practical operation. Figs. $2^\times$ $2^{\times\times}$ represent other forms thereof.

In the drawings, T is the slip-ticket; $d$ $d$, sectional divisions for the dollars and cents of the respective sales; $s$, the consecutive numbers of said sections; $a$ $a$, the sectional spaces for the cashier's audit-imprint, above which is a numeral, $c$, indicating the particular cashier who receives the slip-ticket and places his audit-mark thereon.

C C' represent forms of cashier's audit-imprint seals.

G represents sectional divisions for reception of the record of the gross sum handed the sales-clerk by each customer, from which payment is to be taken by the receiving-cashier in liquidation of the sales appearing on the aligning sale-section, and which cashier returns to the transmitting-sales clerk the exact change, and at the same time sends back the slip-ticket upon which said cashier has stamped his audit-mark in a division, $a$ $a$.

The operation of my invention is as follows: Slips, as illustrated in Fig. 1, having been prepared, each sales-clerk is, at the commencement of each day's business, supplied with a given quantity thereof. I prefer that such tickets shall be serially numbered, (see S, Figs. 1, $2^\times$, &c.,) and that such serial numbers shall close at the end of one or more days, and be recommenced at the numeral 1 periodically, the object of these serial numbers being, first, to prevent waste of slip-tickets, and, secondly, that the general clerk in charge thereof, when he issues them to the sales-clerks shall debit each one with the quantity delivered and their serial numbers. This enables a definite trace to the identical receiving-clerk, should there be any error in placing the proper indicating numeral or emblem upon the spaces F H, or any other required record upon any of the other sectional spaces. Again, the serial numbers serve the purpose of a check against accidental or intentional destruction of any of the slip-tickets, the practical operation of my invention contemplating that every slip-ticket issued to the sale-clerk shall be accounted for, whether utilized for sales or not. It is then the duty of the receiving-sales clerk to take the first ticket of the series delivered and fill up the space F with an indicating-numeral. Next place upon the space $f$ the proper date and the space H with the letter or other emblem of said clerk's special department. I will observe that the marginal numerals $s$, indicating the sections $d\ d$, should commence at 1 and continue progressively to a predetermined highest number, the same quantity of sale-space sections $d$ being on each ticket. Experience has proven that about twenty-five is a suitable quantity for each ticket. The progressive numbers are continued on the next ticket, and so on in succession until the predetermined highest grade is reached. If twenty-five sections are determined on, it will be manifest that the first ticket will be provided with numerals 1 to 25, inclusive, the next from 26 to 50, inclusive, the next from 51 to 75, inclusive, the next from 76 to 100, inclusive, and so on; but for all practical purposes four tickets, numbered in divisions of twenty-five up to one hundred, is the most convenient.

I am aware that it may be urged that from such limitation one sales-clerk may, if the four tickets are exhausted, make two sales of the same section-number—say, for instance, section four—upon the same day; but such repetition would appear on tickets having, respectively, a different serial number, and no confusion could arise. After the sales-clerk has filled up the first slip-ticket with the date, personal designatory numeral or emblem, and the symbol of the department, it is ready for the next step in its practical use. It is not, however, necessary that the date, the clerk's designatory number, and the department-emblem shall be placed on said slip-tickets by said receiving-clerk. The tickets may be issued with such spaces S F $f$ H, or either of them, already filled up.

Suppose a purchase is made amounting to seven dollars. Said sum is entered in spaces $d\ d$. The amount of cash tendered by the customer—say ten dollars—is then placed in an opposite division, G, (see Fig. 2,) and at the same time a like entry of the sum of the sale should be entered upon an appropriate book. The slip-ticket and the cash are then sent to the cash-receiving office, and the cashier in charge takes out of the sum appearing on division G sufficient to pay for the sale written in the opposite sales-section and aligning therewith, then places an audit-mark, C, upon the same line in a division, $a$, and returns the slip-ticket, with the change, to the transmitting-sales clerk.

In Figs. 1 and 2 I show but two columns of audit-sections, $a\ a$, with appropriate cashier's designations, $c\ c$; but these can be increased as required, and be within the scope of my invention. I do not rely upon the special arrangement of the sections $d\ a$ G, as shown in Figs. 1 and 2, for their relative positions may be altered without changing the character of my invention.

Figs. $2^\times$ and $2^{\times\times}$ show forms that illustrate how the several columns may be interchanged. Said figures show arrangements for four and five cashiers, respectively.

When any one of the slip-tickets reaches one of the cashiers with all its spaces $d\ d$ filled up, it is retained by him and at once sent to a book-keeper or auditor. So, too, at any time during a day can incompletely-filled slip-tickets be called in for verification. Therefore it is obvious that definite trace of the amount received by each cashier can be ascertained by means of sum-total sections $t\ t'$ on slip-ticket T. Hitherto such work has been delayed for the close of each day's transactions, and it was difficult to trace out errors. My invention provides means for adding up small slips—say, of twenty-five sales—with cashier's audit-marks thereon at a time, then verifying the same.

Should any question arise between the individual cashiers, the columns $c\ c\ d\ d$ of the slip-tickets, with their special audit-marks, will solve every such question, and in like manner will the gross daily cash-receipts from sales, as shown by the slip-tickets, show precisely what sum the united cashiers should have on hand.

As before said, the form of the several tickets may be varied without departure from my invention.

Slip-ticket T is peculiarly adapted for the devices known as "store-service," wherein cash-boys are dispensed with; but it is by no means confined to such purpose. It is equally adaptable for use in any commercial enterprise where a number of sales-clerks or other persons handle cash for transmission to a general depository, and is in contradistinction to the prevailing method of using a single slip or ticket for each transaction.

Having now fully described my invention, what I claim is—

1. As a new article of manufacture, a store cash-service ticket, T, having thereon a column of dollar-and-cent sections, $d\ d$, with casting-up space at the foot thereof, each of said spaces $d\ d$ having marginal numerals in consecutive order and laterally-aligning gross-receipt spaces G, and provided alongside of such spaces with sectional divisions $a\ a$, adapted and intended to receive cashier's audit-marks, all arranged as described, as and for the purpose intended, substantially as described.

2. In a store cash-service system, the slip-ticket T, having spaces thereon designed and adapted to receive a serial number, a clerk's designation, a date, and a department-emblem, all arranged substantially as set forth, as and for the purpose intended.

3. As a new article of manufacture, a store cash-service ticket, T, having thereon a column of sections, $d\ d$, with casting-up space at the foot thereof, each of said sections $d\ d$ having marginal numerals in consecutive order and laterally-aligning gross-receipt spaces G, provided alongside of such spaces, with sectional divisions $a\ a$, adapted and intended to receive audit-marks of a receiving-cashier, and further provided with spaces for serial number, department-emblem, clerk's designation, and date-space, all arranged as described, as and for the purpose intended, substantially as described.

CHARLES BAUM.

Witnesses:
SAML. H. JACOBSON,
MORRIS PRICE,
E. PIFFERLING.